Patented Jan. 7, 1941

2,227,860

UNITED STATES PATENT OFFICE 2,227,860

WELL TREATING FLUID AND METHOD OF APPLICATION

Leo Clark Morgan and Troy J. Stewart, Wichita, Kans.; said Stewart assignor to said Morgan No Drawing. Application July 22, 1938, Serial No. 220,701

7 Claims. (Cl. 166—21)

The present invention is related to a pending application of one of us (Leo Clark Morgan), Serial No. 160,447, filed August 23, 1937, which issued August 23, 1938 as United States Patent 2,128,160 and also to a continuation-in-part of said application Serial No. 160,447, which continuing application was filed July 18, 1938 issued August 23, 1938, as United States Patent No. 2,128,161.

The present invention relates to the treatment of wells with acids for the purpose of increasing the rate of production thereof, and has particular reference to an oil well treating fluid of improved properties.

As is well known, in the acid treatment of oil wells for the purpose of increasing the rate of production thereof, a solution of hydrochloric acid, which is usually commercial muriatic acid, is introduced into the well, and after the acid has eroded the adjacent acid soluble earth formation, the spent treating fluid is withdrawn. It has been found that muriatic acid of commerce customarily used in such acidizing treatment contains appreciable quantities of sulfuric acid and iron salts. These impurities in the acid introduced into the well, together with the soluble sulfates and iron salts produced from the earth formation during acidizing, provide the necessary materials for the formation of precipitates which have a tendency to clog the flow channels of the earth formation when the acid spends itself.

In pending application Serial No. 160,447, now United States Patent No. 2,128,160 and the continuation-in-part thereof filed about July 18, 1938, now United States Patent 2,128,161 there is disclosed a novel well treating fluid which obviates the disadvantages resulting from calcium sulfate and similar insoluble calcium salts. According to the invention disclosed in said pending applications, a small proportion of a calcium sequestering agent is added to the acid to be used as the well treating fluid, and such calcium sequestering agent holds the calcium in solution, thereby preventing the precipitation of insoluble calcium salts. The present invention is in the nature of an improvement upon that disclosed and claimed in the aforesaid pending applications.

As suggested above, it has been found that the iron present in the treating fluid during the period of use presents an additional problem which must be solved if maximum efficiency is to be obtained in preventing the formation of secondary precipitates in the spent well treating fluid. The iron which is contained in the solution during the period of acid treatment may be present either in the ferrous state or the ferric state, or both. These two forms of iron ions differ, not only as to their valence charge (ferrous $Fe^{++}$, ferric $Fe^{+++}$) but also their chemical properties. In the manufacturing and transportation of hydrochloric acid, the acid is at times in contact with iron, and the iron dissolves in the acid in accordance with the following ionic equation:

$$Fe \rightarrow Fe^{++} + 2(e) \qquad (1)$$

The ferrous ion, however, is rapidly oxidized to the ferric state, thereby imparting a yellow color to the acid solution, the ferrous ion solution being "water white."

$$Fe^{++} \rightarrow Fe^{+++} + (e) \qquad (2)$$

We have found that the ferric ion in the solution reduces the efficiency of the calcium sequestering agent which is used to prevent the formation of insoluble calcium salts. Thus, for example, using sodium hexa meta phosphate as a calcium sequestering agent, when this agent is aded to the acid the ferric ions in said solution react with the meta phosphate ions to form $Fe_2P_6O_{18}$, which is only slightly soluble in neutral and weak acid solutions. The $Fe_2P_6O_{18}$ appears as a gelatinous precipitation and not only adds to the quantity of precipitate, but tends to prevent the sequestration of calcium sulfate, inasmuch as the meta phosphate ion is effectively removed from solution. On the other hand, the ferrous iron reacts with the hexa meta phosphate to produce ferrous hexa meta phosphate $Fe_3P_6O_{18}$, which is soluble in neutral and acid solutions, and the meta phosphate is free to function as a calcium sequestering agent. In other words, when the acid solution contains a calcium sequestering agent, iron in the ferric state tends to react therewith and form precipitates which clog the pores of the earth formation, whereas iron in the ferrous state does not react to form a precipitate.

It was observed that when limestone is treated with a hydrochloric acid solution containing 15% by weight of hydrochloric acid and also containing 0.49 gram of ferric iron per liter and 1.75 grams of sulfuric acid per liter, the addition of sodium hexa meta phosphate to this acid solution prior to its reaction with the limestone failed to completely prevent the formation of a precipitate. If, however, the ferric iron is reduced to the ferrous state before the addition of the sodium hexa meta phosphate to the acid solution, the precipitate may be substantially completely prevented, and the spent solution has properties comparable to those resulting from the reaction of a solution of hydrochloric acid containing 15% by weight chemically pure hydrochloric acid.

Accordingly, one of the objects of the present invention is to provide a well treating fluid which obviates the formation of insoluble iron salts as well as insoluble calcium salts.

A further object is a well treating fluid which not only prevents the precipitation of insoluble iron and calcium salts, but also maintains the mud normally present in an oil well in a suspended or dispersed condition.

A further object is an improved method of treating an oil well for the purpose of increasing the rate of production thereof, which method obviates the clogging of the pores of the earth formation with mud and insoluble iron and calcium salts.

A still further object is a well treating fluid which is retarded in its rate of reaction and which obviates the clogging of the pores of the earth formation with mud and insoluble salts of iron and calcium.

Other subjects will be apparent as the invention is hereinafter more fully described.

The foregoing objects may be accomplished by treating the well with an acid solution containing a calcium sequestering agent and insuring that all the iron present in the solution has been reduced or converted to the ferrous state. This reduction of the iron to the ferrous state, as represented by $$Fe^{+++} + (e) \rightarrow Fe^{++} \qquad (3)$$

may be accomplished by a number of ways, of which the following may be cited by way of example:

(1) By hydrogen sulfide, according to the equation:

$$2FeCl_3 + H_2S \rightarrow 2FeCl_2 + S + 2HCl$$

(2) By sulfur dioxide—

$$2FeCl_3 + H_2O + H_2SO_3 \rightarrow H_2SO_4 + 2FeCl_2 + 2HCl$$

(3) By active metals which readily replace hydrogen from acid solution, for example, zinc, which latter reacts according to the equation:

$$Zn \rightarrow Zn^{++} + 2(e)$$
$$2(e) + 2Fe^{+++} \rightarrow 2Fe^{++}$$

(4) By salts which exhibit variable valences. An electrolyte in the reduced or "ous" state will reduce any electrolyte in the oxidized or "ic" state, which is lower in the series of "normal reduction potentials." Among the salts of this character the following may be mentioned by way of example:

Chromous salts
Titanous salts
Stannous salts

Of these the preferred agents are the stannous salts and the reaction may be expressed in the following ionic form:

$$2Fe^{+++} + Sn^{++} \rightarrow 2Fe^{++} + Sn^{++++}$$

(5) By external electromotive force. If a direct current is caused to flow between properly arranged electrodes immersed in the acid solution containing the ferric ion, the iron will be reduced at the cathode according to the ionic equation:

$$Fe^{+++} + (e) \rightarrow Fe^{++}$$

As an example of the preferred embodiment of the present invention, the reduction of the ion present in the well treating fluid may be accomplished by adding a small percent of a stannous salt to an acid solution consisting of 15% muriatic acid and less than 1% of a calcium sequestering agent such as those disclosed and claimed in the pending application of Leo Clark Morgan Serial No. 219,829, which matured August 23, 1938 as United States Patent No. 2,128,161.

For a more complete discussion of the calcium sequestering agents, reference may be had to the aforesaid pending application of Leo Clark Morgan which issued as United States Patent No. 2,128,161. By way of example, however, of such calcium sequestering agents, mention may be made of compounds which contain or produce an acid solution a meta phosphoric acid; a number of complex nitrogen-phosphorus compounds and certain synthetic organic detergents such as those of the long chain fatty alcohol alkali metal sulfate, for example, that sold under the name of "Gardinol L S Flakes." Preferably, however, we employ an alkali metal hexa meta phosphate such as the sodium salt. An acid solution containing 15% hydrochloric acid to which is added less than 1% sodium hexa meta phosphate and less than 1% stannous chloride, and less than 1% of a mud peptizing agent such as that disclosed in the pending application of Leo Clark Morgan, Serial No. 160,447, which issued as United States Patent No. 2,128,160 constitute the preferred embodiment of the present invention. If desired, an anti-foaming agent such as octyl alcohol or capryl alcohol may be added to the treating fluid.

The resulting acid solution when introduced into the bore hole not only exhibits a retarded rate of reaction, but also prevents the formation of insoluble calcium and iron salts and the precipitation of mud within the pores of the earth formation.

From the foregoing detailed description of the present invention, it will be apparent that many variations thereof may be made without departing from the spirit and scope thereof. Thus for example an excess of reducing agent may be used if desired to assure reduction of any iron which might be dissolved from the metal equipment or earth formation during treatment. We therefore intend to be restricted only in accordance with the following claims.

We claim:

1. In the treatment of a fluid producing well to increase the rate of production thereof, the step which comprises introducing into the well a treating fluid comprising an acid capable of forming water soluble salts with the earth formation, said acid containing a small proportion of a calcium sequestering agent, and a small proportion of a reducing agent capable of converting ferric ions to the ferrous state.

2. A well treating fluid comprising an acid capable of forming water soluble salts with the earth formation, said acid containing a calcium sequestering agent and a reducing agent capable of converting ferric ions to the ferrous state.

3. A well treating fluid comprising an acid capable of forming water soluble salts with the earth formation, said acid containing a small proportion of a calcium sequestering agent, and a small proportion of a stannous salt, whereby to convert ferric iron salts present in the earth formation to the corresponding ferrous salts.

4. A well treating fluid comprising an acid capable of forming water soluble salts with the earth formation, a small proportion of a meta phosphoric acid as a calcium sequestering agent, a corrosion inhibitor, and a reducing agent capable of converting ferric ions present in the treating fluid and in the earth formation to ferrous ions.

5. A well treating fluid comprising a major proportion of hydrochloric acid, said acid containing a small proportion of meta phosphoric acid as a calcium sequestering agent, a corrosion inhibitor, a reducing agent to convert the ferric ions to ferrous ions, and a small proportion of a mud peptizing agent.

6. A well treating fluid comprising hydrochloric acid, hexa meta phosphoric acid, a stannous salt, a corrosion inhibitor, and a protective colloid selected from the group consisting of glue, starch, and gelatin.

7. The well treating fluid of claim 6 to which has been added an anti-foaming agent selected from the group consisting of octyl alcohol and capryl alcohol.

LEO CLARK MORGAN.
TROY J. STEWART.